(No Model.)

R. W. HENT.
ROLLER BEARING.

No. 394,769. Patented Dec. 18, 1888.

Witnesses:
Henry H. Reid
Samuel H. Henry

Inventor:
Reuben W. Hent

UNITED STATES PATENT OFFICE.

REUBEN W. HENT, OF SAN FRANCISCO, CALIFORNIA.

ROLLER-BEARING.

SPECIFICATION forming part of Letters Patent No. 394,769, dated December 18, 1888.

Application filed March 3, 1888. Serial No. 266,084. (No model.)

*To all whom it may concern:*

Be it known that I, REUBEN W. HENT, a citizen of the United States, residing in the city and county of San Francisco, and State of California, have invented a certain new and useful Improvement in Roller-Bearings, of which the following is a specification.

My invention is an improvement on my roller-bearing shown and described in my application for patent filed April 16, 1887, Serial No. 235,040, in which a ring bears at its periphery on journals of a series of bearing-rollers bearing directly on the shaft and casing and at its inner side on journals of a series of separating-rollers bearing neither on the shaft nor casing, but on the bearing-rollers, keeping the latter separate from each other, and by such bearing kept from contact with the shaft. In said roller-bearing, after a little wear of the casing and bearing-rollers, said journals are liable to shift from the ring. In my improvement shown and described in my application for patent filed February 18, 1888, Serial No. 264,520, said shifting of said journals of the separating-rollers is prevented, and in my improvement shown and described in my application for patent filed February 27, 1888, Serial No. 265,434, said shifting of said journals of the bearing-rollers is prevented.

The object of my present improvement is to prevent said shifting of said journals of both series of rollers and to keep their orbits concentric. This object is attained by the addition of a smaller (or inner) ring bearing at its periphery on journals of the separating-rollers and of a larger (or outer) ring bearing at its inner side on journals of the bearing-rollers, being the combination of said two improvements and resulting in the maintenance of the concentricity of said orbits. In such additional rings and the peculiar construction and combinations of the parts hereinafter set forth consists, essentially, my improvement.

It is illustrated in the accompanying drawings, in which—

Figure 5:
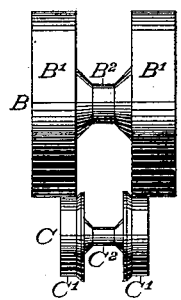
Figure 2:
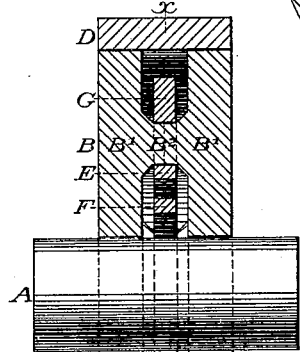
Figure 1:
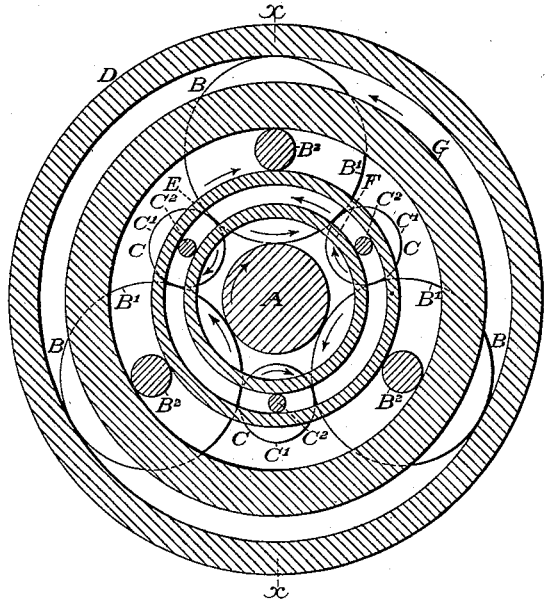
Figure 6:
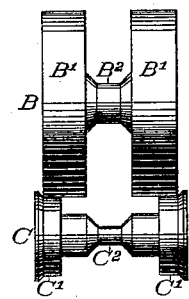
Figure 3:
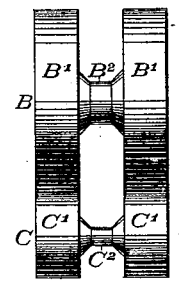
Figure 4:
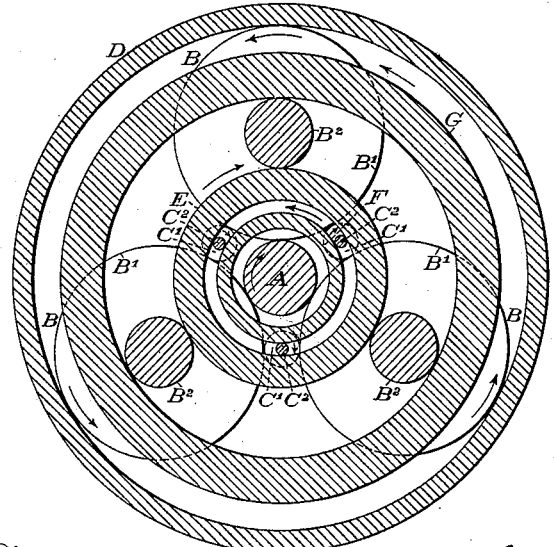
Figure 7:
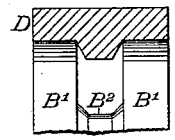
Figure 9:
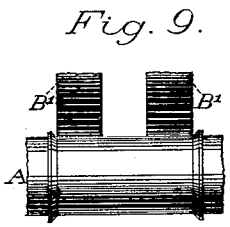
Figure 10:
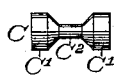

Figure 1 is a transverse section through the center or on the line $x\,x$, Fig. 2, of a roller-bearing embodying my improvement. Fig. 2 is a longitudinal section through the center or on the line $x\,x$, Fig. 1. Fig. 3 is a side view of a bearing-roller and a separating-roller, Fig. 1, showing the relative positions of the rollers as seen along the plane tangent to both. Fig. 4 is a transverse section through the center of my improved roller-bearing, in which the axes of the separating-rollers are in the planes of the axes of the bearing-rollers. Figs. 5, 6, 7, 8, and 9 are views showing means of retaining the several parts in their proper longitudinal positions, Figs. 5 and 6 also showing separating-rollers reduced in weight. Fig. 10 is a side view of a short separating-roller, Fig. 4.

A represents the shaft; B, the bearing-rollers as wholes; C, the separating-rollers as wholes; D, the casing, and E, F, and G the rings.

The rings are hollow cylinders coaxial with the shaft and with each other and of different diameters, F representing the smaller, (or inner,) G the larger, (or outer,) and E the intermediate ring.

Each bearing-roller B consists of two journals, B', bearing directly on the shaft and casing, and of a smaller journal, B², located between and coaxial with the journals B', and rotating between and in contact with the periphery of the ring E and the inner side of the ring G.

The separating-rollers C, keeping the rollers B separate from each other, consist each of two journals, C', bearing only on the journals B', each journal C' on and between two journals B', and of a smaller journal, C², located between and coaxial with the journals C', and rotating between and in contact with the inner side of the ring E and the periphery of the ring F. The intermediate ring, E, is interposed between and bears on the journals B² at its periphery and the journals C² at its inner side. The smaller (or inner) ring, F, bears at its periphery on the journals C², and the larger (or outer) ring, G, bears at its inner side on the journals B².

The arrow-heads indicate the relative directions, when the casing is stationary, of the axial rotations of the shaft and rollers and of the rings caused by the axial rotations of the journals B² and C².

The ring E, forming bearings for the journals B², (*i. e.*, the rollers B,) independent of any bearing of the journals B' on the journals C′ or the shaft, prevents the orbit of the rollers B from contracting on account of any wear of the journals B′ or the shaft.

The ring F, forming bearings for the journals C², (i. e., the rollers C,) independent of any bearing of the journals C′ on the journals B′, prevents the orbit of the rollers C from contracting on account of any wear of the journals B′.

The ring G, forming bearings for the journals B², (i. e., the rollers B,) independent of any bearing of the journals B′ on the casing, prevents the orbit of the rollers B from expanding on account of any wear of the journals B′ or the casing. Therefore, if all the rings and the journals rotating in contact therewith retain their original dimensions, no contraction or expansion of either orbit can occur, the journals B² and C² will be kept in contact with the ring E, and each orbit being kept concentric with the same ring the two orbits will be kept concentric with each other.

The rings F and G being rotated without sliding friction, receiving none of the pressure of the load, and the ring F being required only to resist the inward pressure of the journals C², which cannot exceed the weight of the rollers C, and the ring G being required only to resist the outward pressure of the journals B², which cannot exceed the weight and centrifugal force of the rollers B and can be received by this ring only during one-third of the travel of the rollers B in their orbit, when only three of these rollers are employed, it follows (especially if said weight and centrifugal force are reduced and the ill effects of what necessarily remains of them are avoided to the extent permissible, as set forth and recommended in said application, Serial No. 265,434) that the rings F and G and the journals rotating in contact therewith will incur no substantial wear and retain substantially their original dimensions, and (the ring E and the journals B² and C² also retaining substantially their original dimensions) that the orbits of the rollers B and C will be kept concentric with each other whatever the wear of the shaft, the journals B′, and the casing. If the three rings are of equal length and located between the same planes, as shown in the drawings, the inner ends of both journals B′ and C′ are preferably beveled, as shown in Figs. 2, 3, 5, and 6, sliding friction between said ends and the rings being thus avoided.

All the journals B′ and C′ may be formed separate from and securely and rigidly attached to the journals B² and C², or all or any of them (except, of course, those necessarily removable to permit the insertion between the shaft and casing of the rollers and rings in their proper relative positions) may be formed integral with the journals B² and C², respectively.

I claim as my invention—

1. In a roller-bearing, the combination, with a series of bearing-rollers bearing directly on the shaft and casing, a series of separating-rollers bearing neither on the shaft nor casing, but on the bearing-rollers, and a ring bearing at its periphery on journals of the bearing-rollers and at its inner side on journals of the separating-rollers, of a smaller ring bearing at its periphery on journals of the separating-rollers and a larger ring bearing at its inner side on journals of the bearing-rollers, substantially as set forth.

2. In a roller-bearing, the combination, with the series of bearing-rollers B, consisting each of two journals, B′, bearing directly on the shaft A and casing D, and of a journal, B², the series of separating-rollers C, consisting each of two journals, C′, bearing only on the journals B′, and of a journal, C², and the ring E, bearing at its periphery on the journals B² and at its inner side on the journals C², of the ring F, adapted to bear at its periphery on the journals C², and the ring G, adapted to bear at its inner side on the journals B², substantially as shown and described, and for the purposes set forth.

3. In a roller-bearing, the combination of a series of bearing-rollers bearing directly on the shaft and casing, and having journals adapted to rotate in contact with the periphery of a ring coaxial with the shaft and in contact with the inner side of a larger ring, also coaxial with the shaft, and a series of separating-rollers bearing neither on the shaft nor casing, but on the bearing-rollers, and having journals adapted to rotate in contact with the inner side of said first-mentioned ring and in contact with the periphery of a smaller ring, also coaxial with the shaft, all constructed and arranged substantially as set forth.

4. In a roller-bearing, the combination of the series of bearing-rollers B, consisting each of two journals, B′, bearing directly on the shaft A and casing D, and of a journal, B², adapted to rotate between and in contact with the periphery of the ring E and the inner side of the ring G, and the series of separating-rollers C, consisting each of two journals, C′, bearing only on the journals B′, and of a journal, C², adapted to rotate between and in contact with the inner side of said ring E and the periphery of the ring F, all constructed and arranged substantially as shown and described, and for the purposes set forth.

5. In a roller-bearing, the combination, with three rings coaxial with the shaft and of different diameters, of a series of bearing-rollers bearing directly on the shaft and casing, and having journals adapted to rotate in contact with the periphery of the intermediate ring and in contact with the inner side of the outer ring, and a series of separating-rollers bearing neither on the shaft nor casing, but on the bearing-rollers, and keeping the latter separate from each other, and having journals adapted to rotate in contact with the inner side of said intermediate ring and in contact with the periphery of the inner ring, all constructed and arranged substantially as and for the purposes set forth.

6. In a roller-bearing, the combination, with the rings E, F, and G, coaxial with the shaft A, of the series of bearing-rollers B, consisting each of two journals, B', bearing directly on the shaft and casing, and of a journal, $B^2$, located between the journals B', and adapted to rotate between and in contact with the periphery of the ring E and the inner side of the ring G, and the series of separating-rollers C, keeping the rollers B separate from each other, and consisting each of two journals, C', bearing only on the journals B', each journal C' on and between two journals B', and of a journal, $C^2$, located between the journals C', and adapted to rotate between and in contact with the inner side of the ring E and the periphery of the ring F, all constructed and arranged substantially as shown and described, and for the purposes set forth.

7. In a roller-bearing, the combination, within the casing, of the shaft, three rings coaxial with the shaft and of different diameters, a series of bearing-rollers bearing directly on the shaft and casing, and having journals adapted to rotate in contact with the periphery of the intermediate ring and in contact with the inner side of the outer ring, and a series of separating-rollers bearing neither on the shaft nor casing, but on the bearing-rollers, and keeping the latter separate from each other, and having journals adapted to rotate in contact with the inner side of said intermediate ring and in contact with the periphery of the inner ring, keeping the separating-rollers from contact with the shaft, all constructed, arranged, and operating substantially as and for the purposes set forth.

8. In a roller-bearing, the combination, within the casing D, of the shaft A, the series of bearing-rollers B, consisting each of two journals, B', bearing directly on the shaft and casing, and of a journal, $B^2$, located between the journals B', and adapted to rotate between and in contact with the periphery of the ring E and the inner side of the ring G, the series of separating-rollers C, keeping the rollers B separate from each other, and consisting each of two journals, C', bearing only on the journals B', each journal C', on and between two journals B', and of a journal, $C^2$, located between the journals C', and adapted to rotate between and in contact with the inner side of said ring E and the periphery of the ring F, the said ring E adapted to bear at its periphery on the journals $B^2$ and at its inner side on the journals $C^2$, the said ring F adapted to bear at its periphery on the journals $C^2$, and keeping the rollers C from contact with the shaft, and the said ring G adapted to bear at its inner side on the journals $B^2$, all constructed, arranged, and operating substantially as shown and described, and for the purposes set forth.

9. A roller-bearing comprising the shaft A, the casing D, the series of bearing-rollers B, consisting each of two journals, B', bearing directly on the shaft and casing, and of a journal, $B^2$, located between the journals B' and rotating between and in contact with the periphery of the ring E and the inner side of the ring G, the series of separating-rollers C, consisting each of two journals, C', bearing only on the journals B', each journal C' on and between two journals B', and of a journal, $C^2$, located between the journals C', and rotating between and in contact with the inner side of said ring E and the periphery of the ring F, the said ring E bearing at its periphery on the journals $B^2$ and at its inner side on the journals $C^2$, the said ring F bearing at its periphery on the journals $C^2$, and the said ring G bearing at its inner side on the journals $B^2$, all constructed, arranged, combined, and adapted to operate substantially as shown and described, and for the purposes set forth.

REUBEN W. HENT.

Witnesses:
HENRY HUTCHINSON REID,
SAMUEL HENRY HENRY.